United States Patent [19]

Kennedy

[11] 4,394,166
[45] Jul. 19, 1983

[54] SCRAP METAL RECOVERY PROCESS

[75] Inventor: James A. Kennedy, Newnan, Ga.

[73] Assignee: The William L. Bonnell Company, Newnan, Ga.

[21] Appl. No.: 382,880

[22] Filed: May 28, 1982

[51] Int. Cl.³ .................................................. C22B 21/00
[52] U.S. Cl. .................................... 75/65 R; 75/68 R
[58] Field of Search .................... 75/68 R, 44 S, 65 R

[56] References Cited

U.S. PATENT DOCUMENTS

| | | | |
|---|---|---|---|
| 2,302,981 | 11/1942 | Stern | 75/68 R |
| 3,650,830 | 3/1972 | Mathias | 75/68 R |
| 4,010,935 | 3/1977 | Stephens | 75/44 S |
| 4,264,060 | 4/1981 | Twyman | 266/87 |

Primary Examiner—M. J. Andrews
Attorney, Agent, or Firm—Donald L. Johnson; John F. Sieberth; Paul H. Leonard

[57] ABSTRACT

A method for recycling aluminum scrap containing thermal barrier material comprising the steps of comminuting the scrap to short pieces of a predetermined length, conveying the comminuted aluminum scrap to a storage hopper, continuously feeding comminuted aluminum scrap product to an indirect-fired rotary kiln, heating the scrap to a predetermined temperature for a sufficient amount of time to reduce the thermal barrier material in the scrap to combustible gas and cinder and produce a satisfactory aluminum melt furnace feed product, collecting and burning the combustible gases and vapors in a waste heat recovery afterburner to provide sufficient heating values for the scrap heating step, and then feeding the treated scrap to an aluminum melt furnace for melting and further processing.

9 Claims, 1 Drawing Figure

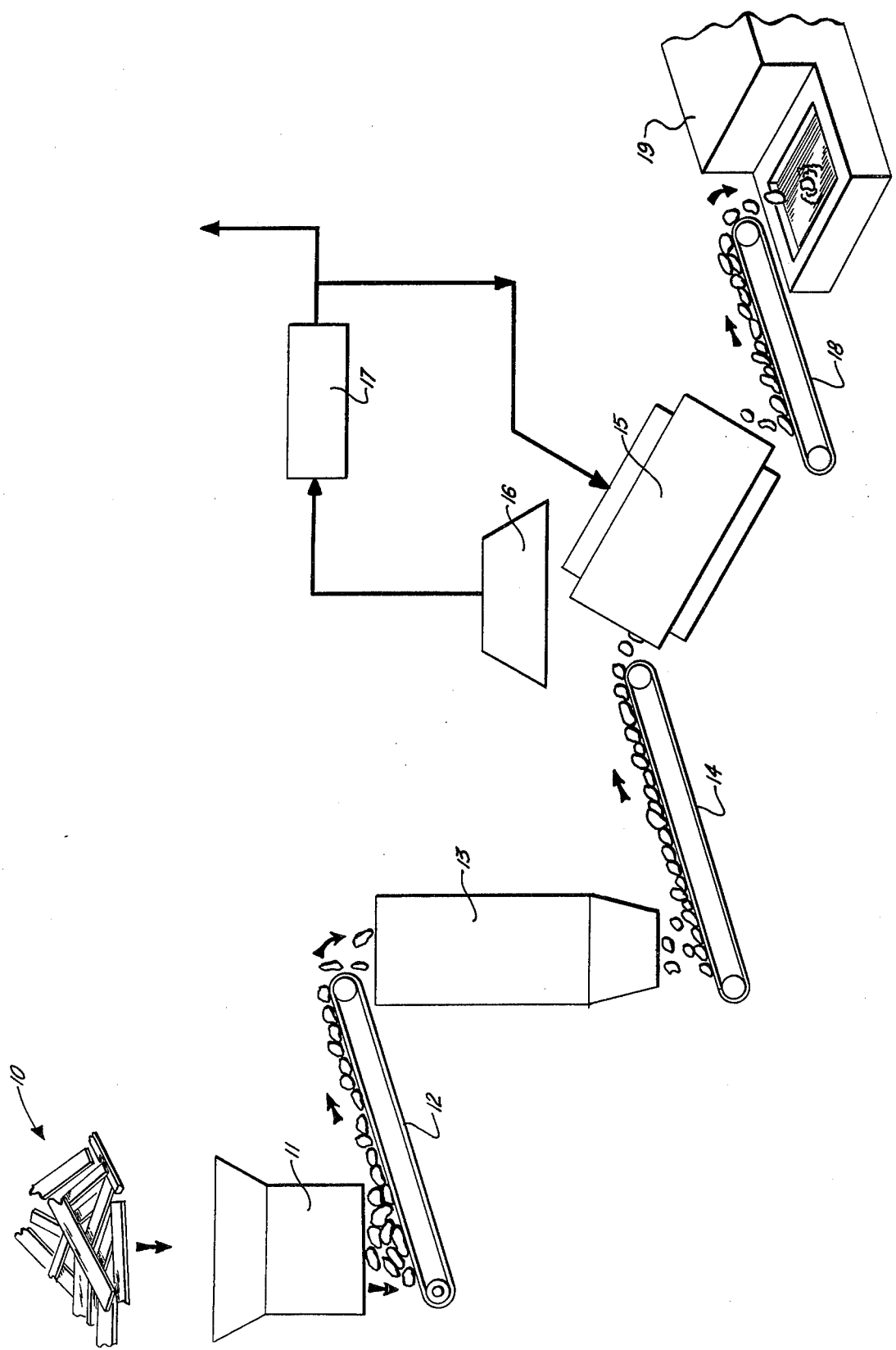

SCRAP METAL RECOVERY PROCESS

BACKGROUND OF THE INVENTION

The present invention is in the general field of processing metal scrap, especially aluminum metal scrap so as to recover the metal in such scrap. The invention is particularly directed to a method for recovering metal from aluminum thermal barrier scrap.

With the ever increasing costs in energy, it becomes more and more desirable to process metal scrap, especially aluminum scrap so as to recover the aluminum so that the metal can be reutilized. Scrap aluminum is usually contaminated with two different types of contaminants, organic contaminants and inorganic contaminants. Organic contaminants most commonly consists of remnants of various types of oils, remnants of various types of coatings or paints and the like. The inorganic contaminants present may include dust particles, pigments indicated previously, minor amounts of various scrap metals other than the principal metal within the scrap and the like. Aluminum scrap will also normally contain varying amounts of aluminum oxide resulting from the oxidation of the aluminum scrap, and or from appropriate anodizing procedures employed in processing the metal from which the scrap originated.

All of these contaminants are preferably removed to as great a degree as possible from the metal scrap prior to the scrap being melted down in an appropriate furnace or melter in order to avoid interference with the operation of the furnace or melter and in order to minimize to as great a degree as reasonably possible the chances of the molten metal obtained from the furnace or melter being contaminated. It has been recognized that an effective manner of getting rid of the organic contaminants present on a scrap metal such as scrap aluminum is to heat the scrap aluminum to sufficient temperatures that substantially all of the organic contaminants will decompose and so that the resulting decomposition products will substantially all vaporize.

It has also been recognized that such scrap should be heated at a temperature which is sufficiently low so as to minimize oxidation of the aluminum and at a temperature which is sufficiently low so that there is little chance of the aluminum scrap tending to agglomerate or fuse into a body which is difficult to handle or which must be broken up. It has also been recognized that the amount of time that the scrap is heated should be controlled so that the scrap is heated no longer than is reasonably necessary to decompose the organic contaminants and is not held at an elevated temperature sufficient to accomplish such decomposition for a sufficient period for agglomeration of the aluminum particles to take place. Although a wide variety of different separation techniques based upon differences in various physical properties have been capable of being used to recover inorganic contaminants from metal scrap such as aluminum scrap, it normally has not been economic to utilize such procedures. In the recovery of aluminum from aluminum scrap various organic contaminants of an oxide character have normally been separated in a furnace or melter. The majority of such contaminants will float to the top of the bath of molten aluminum to form slag or slag-like skin of inorganic contaminants or slag-like skin of inorganic contaminants on the molten metal which can be skimmed off of the metal in accordance with well established techniques. Excessive slag formation during recovery of metal such as aluminum is disadvantageous because of increased labor costs in removing such slag and loss of metal during such removal procedures.

Various procedures have been proposed for the removal of organic contaminants from scrap such as aluminum scrap. One method has involved heating a bed or body of scrap either directly or indirectly to a point where various organic contaminants vaporize so that they can be ignited. Other procedures have involved conveying a bed of aluminum through a heated chamber while either hot gas is circulated through the bed or while a flame is directed toward the moving bed of scrap. Such procedures are disadvantageous for a variety of reasons. Whenever a flame is directed at a bed of aluminum scrap there is a significant probability of at least some of the aluminum being oxidized. Of course any such oxidation results in lowering of the amount of aluminum metal recovered. Further, the heating of aluminum scrap is relatively difficult to control because the quantity of organic contamination of such scrap may vary significantly. Some procedures are unsafe because of explosion hazards caused by the presence of significant quantities of organic material in the air.

In a more recent process, aluminum is recovered from aluminum scrap using a process in which aluminum scrap is fed into the upper inlet of a rotary kiln located so that the discharge end of the kiln discharges the scrap directly into a melting furnace. In such process the kiln and the furnace are connected by appropriate conduits or ducting containing a burner and a blower so that there is a continuous gas flow through the furnace and then through the kiln. Such flow is counter-current to the direction of scrap flow in the kiln. The burner serves to maintain the temperature of the recycled gas to a designated value. With such type of systems some of the recycled gas is bled off from the system through a vent in the furnace so it can discharge to the atmosphere. This separated gas may then pass through a recuperator so as to preheat either the air supplied to the burner to sustain combustion or the fuel burned in the burner or both. Although this process has some advantages over earlier procedures, it is considered to be disadvantageous for several reasons. The rotary kiln used with this procedure is essentially operated in a conventional manner so as to heat the scrap passing through it by the counter-current flowing gas stream. Such is not considered to tend to effect any significant removal of inorganic contaminants in the scrap and, further, if there is any removal of inorganic contaminants from the scrap it is considered that such procedure will only convey the inorganic contaminants back to the furnace where they will tend to settle out and form slag or skin on the molten metal within the furnace. Additionally, because of the counter-current flow within the rotary kiln and the relationship of the kiln to the furnace the temperature of the scrap discharged to the furnace will be related to the temperature within the furnace. As a consequence of this it is considered that it is impossible to obtain the degree of temperature control in the furnace necessary for most effective removal of organic material from the scrap.

More recently, U.S. Pat. No. 4,264,060 discloses an apparatus and method for recovering scrap metal. The apparatus consists primarily of a direct-fired rotary kiln. In such a process scrap is passed through the upper inlet of a rotary kiln while rotating the kiln so that the scrap is cascaded through the interior of the kiln as it is simultaneously moved through the kiln to the lower discharge end of the kiln, concurrently passing a gas stream at a temperature sufficient to cause decomposition and vaporization of organic material in the scrap through the kiln from the upper end to the lower end of the kiln so the gas stream contacts the scrap as it is cascaded through the interior of the kiln, and then separating the gas stream from the scrap at the discharge end of the kiln as the scrap is discharged from the kiln. The heated scrap is then directly passed to the melting furnace under such conditions that the gas stream from the kiln is isolated from the atmosphere above the melting furnace. The gas stream from the kiln is preferably passed through a dust collector to remove entrained inorganic materials and then is burned in an incinerator used to supply the hot gas stream introduced into the inlet end of the kiln. The incinerator may also be used to burn or incinerate gas from the furnace or melter.

Although some degree of success has been achieved with the foregoing processes, especially the latter, such procedure is not effective with aluminum scrap containing thermal barrier material. Such scrap is particularly unsuitable for direct charging to melt furnaces because of dense smoke pollution which is omitted. Chopping of the thermal barrier containing scrap into very small particles, less than one-half inch and separation of the aluminum therefrom by mechanical means, such as vibration, is not only expensive but results in excessive melt-loss.

In some thermal break shapes, the plastic or thermal barrier material is substantially bonded to the metal. Removal of the plastic by mechanical means is extremely difficult, if not impossible. In other thermal break shapes, the thermal barrier material is mechanically joined to the metal. Mechanical separation is difficult and costly even with these types of scrap shapes.

SUMMARY OF THE INVENTION

The present invention provides a process for recovering scrap metal, especially aluminum metal and particularly, aluminum metal containing thermal barrier material such as plastic, by charging the scrap by conventional means into a scrap chopper wherein the scrap is reduced into pieces of from about 4 inches to about 18 inches. The scrap pieces so shortened are then conveyed by any suitable means to a storage bin or hopper. From such hopper, the scrap pieces are discharged or otherwise transferred to an indirect-fired preheater, particularly an indirect-fired rotary kiln. The thermal barrier containing metal scrap is then heated to a temperature of 800° F. to 900° F., without any direct contact with combustion products. Oil, paint, plastic thermal barrier material, water and other foreign material adhering to the aluminum are driven off during a dwell time of about 30 minutes to one hour. The fumes from the preheater are collected and passed through an afterburner. The heat produced by the afterburner, including the fuel value of the various organic contaminants for the various vaporized organic contaminants, may be used to provide the indirect heat on the preheater. The preheated, clean scrap is then conveyed to the charge well of an existing melt furnace for melting and further processing.

It is therefore an important object of the present invention to provide a metal recovery process for thermal barrier extrusion scrap metal, without polluting the atmosphere and without the necessity of segregating the thermal barrier material.

Another object of the invention is to provide a process which is relatively economical in comparison with prior art processes.

Another important object of the present invention is to provide a process for melting thermal-barrier aluminum scrap wherein the melt loss of aluminum is substantially reduced.

Still another object of the present invention is to provide a completely mechanized system wherein material handling costs are substantially reduced.

Other objects and advantages of the present invention will become more readily apparent from a consideration of the following description and drawing wherein:

BRIEF DESCRIPTION OF THE DRAWING

The construction designed to carry out the invention will be hereinafter described together with other features thereof.

The invention will be more readily understood from a reading of the following specification and by reference to the accompanying drawing forming a part thereof, wherein an example of the invention is shown, and wherein:

The FIGURE is a schematic flow diagram setting forth the process of the present invention.

The flow diagrams indicated in the drawing illustrate manners in which various apparatuses may be used in accordance with the invention and in which the invention may be practiced. The invention set forth herein embodies both tangible and intangible concepts and can be readily utilized by those skilled in the field of scrap metal treatment and in a variety of ways to achieve the benefits in accordance with the present invention.

DESCRIPTION OF THE PREFERRED EMBODIMENTS

Referring to the drawing, a scrap pile of thermal-barrier containing aluminum scrap is indicated generally at 10. Scrap from the scrap pile is transferred to a comminutor or chopper 11 where the various scrap metal pieces are reduced to lengths no longer than about 18 inches, but no shorter than about four inches. The small pieces of scrap metal are then discharged to a conveyor 12 and transported to a bin or storage hopper 13. The chopped scrap is then discharged to another conveyor 14 and then into an indirect-fired preheater, preferably an indirect-fired rotary kiln 15. The temperature of the preheater is raised to 800° F. to 900° F., without any direct contact with the combustion products. Following a dwell time of about 30 minutes to one hour, the vaporized material such as oil, paint, thermal barrier material, water and other foreign material adhering to the aluminum metal are collected in a fume hood 16 and then passed to an afterburner 17. The heat produced by the afterburner, including the fuel value of the vaporized materials, may be used to provide the indirect heat on the pre-heater. After the scrap is preheated to the desired temperature, it is then transferred to a conveyor 18 and then charged to the well of an existing melt furnace 19 for melting and further processing.

It is important that the pre-heater be an indirect fired one, so that no direct contact of flame is made with the thermal barrier materials. Urethane, a commonly used thermal barrier material produces very dense smoke and carbon monoxide. It is therefore important that the material being processed is not directly exposed to the main flame. This reduces melt losses and also the quantity of off-gasses to be cleaned.

Urethane has a flash ignition of 482° F. and self-ignition at 1112° F. Substantially all of the urethane is driven off in applicant's novel process at about 800° F. Products of the combustion of urethane would contain about 225 ppm of carbon monoxide, trace values of $NO_x$, and 2 ppm of cyanides. Such a level of cyanides is less than that contained in smoke from burning leaves. Substantially all cyanides, carbon monoxide and the dense smoke which results from combustion of the aromatic hydrocarbon present, are eliminated in a process afterburner.

Metal losses during processing are caused by the presence of oil or thermal barrier materials such as urethane on the surface of aluminum scrap, exposure of the metal surface to the oxidizing atmosphere in direct-fired furnaces, excessive comminution or size reduction of scrap, and melting by exposure to flame. The instant process is expected to reduce metal loss by eliminating surface contaminants, by reducing exposure to combustion products, by supplying much of the melting energy by indirect firing in the pre-heater and by providing only enough comminution to facilitate handling, pre-heating and complete submergence in the molten bath of a melt furnace.

Pre-heaters as proposed are currently in operation with reported thermal efficiencies typically 50% or higher as compared with typical melt furnaces efficiencies of 15 to 20%. Supplying a portion of the heat required to melt the aluminum scrap at a higher thermal efficiency raises overall process efficiency, as does the controlled combustion of fuel values in oil, paint, urethane and other materials contained on the scrap. The present process eliminates the need for equipment such as forklifts, portable hoppers and front-end loaders. Machines which require manpower are largely eliminated. Such equipment also often causes damage to the melt furnaces due to carelessness of operation. Additionally, large charge well furnace openings which are necessary to receive the usually long pieces of scrap are eliminated. Furnace fuel efficiency is increased by such smaller openings. By reducing the size of the scrap and mechanically conveying it from one processing location to another processing location, both charging equipment and manpower costs are substantially reduced. Furnace design can also be altered for further improvement in thermal efficiency and reduced maintenance.

The present invention may be used for the melting of any type of metal scrap. It is particularly suited however for the processing of aluminum scrap containing thermal barrier material. Aluminum containing vinyl, polystyrene or urethane is specially suited for treatment in the foregoing process. The process is also suitable for use with mixtures of various types of thermal barrier metal materials, including those mentioned as well as any other aluminum containing plastic materials.

In a large scale test of the process, 7500 pounds of thermal break or thermal barrier containing aluminum scrap were treated. The thermal barrier materials were a mixture of vinyls (PVC), urethanes (polyurethane) and styrenes (polystyrene). Metal recovery was 86 percent. Recovery rates of at least 90 percent can be expected. About seven percent fines of about thumb-nail size of undesirable materials remained.

Scrap metal products containing in excess of 20 percent by weight vinyl must be processed at reduced rates and scrap pieces are preferably chopped to lengths of about 12 to 15 inches. In normal operations, the metal is preferably pre-heated. There should be no problems with workers being exposed to toxic materials.

The process is carried out at controlled temperatures, and is preferably continuous. An indirect-heated rotary sweat furnace or kiln is preferred.

Gases generated are collected in a smoke hood and drawn through a cyclone collector or other suitable collecting device to remove particulate material prior to burning. The gases are then burned in the afterburner.

Ashes, oxides, dirt and other fines and solid particulates are picked up at the discharge end of the furnace. They are then collected in a cyclone followed by a bag-house.

Plastic thermal break materials are completely removed, with no visible residues. All paint is removed from the metal surfaces, leaving only a powdery pigment coating.

Processed aluminum scrap can be charged into a reverbatory furnace without causing or producing emission problems.

The foregoing disclosure and description of the invention is illustrative and explanatory thereof and various changes in the illustrated process may be made within the scope of the appended claims without departing from the spirit of the invention.

What is claimed is:

1. Method for recycling aluminum scrap containing thermal barrier material, said method comprising the steps of:
   (a) comminuting said scrap to pieces from about 18 to about 4 inches in length thereby preparing a relatively uniformly sized aluminum scrap product;
   (b) conveying said comminuted aluminum scrap product to a storage hopper;
   (c) continuously feeding the comminuted aluminum scrap product from said storage hopper to an indirect-fired rotary kiln;
   (d) heating said scrap product in said indirect-fired rotary kiln to a temperature of about 800° to 900° F. for a period of about one-half to one hour thereby substantially completely removing said thermal barrier material as combustible gas and cinder producing a satisfactory aluminum melt furnace feed product;
   (e) collecting and burning said combustible gases and smoke in a waste heat recovery afterburner to provide heating values for said step (d);
   (f) transferring heating values provided in step (e) to said indirect-fired rotary kiln; and,
   (g) feeding said feed product from said indirect-fired rotary kiln to an aluminum melt furnace for melting.

2. The method of claim 1, wherein said aluminum scrap contains from about one to about ten weight percent of said thermal barrier material.

3. The method of claim 1, wherein said aluminum scrap is comminuted to lengths from about 12 to about 15 inches in length.

4. The method of claim 1, wherein said comminution of step (a) is carried out intermittently.

5. The method of claim 1, wherein said comminuted aluminum scrap product is fed to said indirect-fired rotary kiln concurrently with the feeding of the heating values from said afterburner of said step (e).

6. The method of claim 1, wherein said thermal barrier material in said aluminum scrap is selected from rigid polyvinyl chloride or polyurethane materials.

7. The method of claim 1, wherein said thermal barrier material in said aluminum scrap is polystyrene.

8. The method of claim 1, wherein said thermal barrier material in said aluminum scrap is plastic.

9. The method of claim 1, wherein said aluminum scrap is covered with at least some oil, paint, thermal barrier material, or other foreign material.

* * * * *